United States Patent
Gal

(10) Patent No.: US 9,723,561 B2
(45) Date of Patent: Aug. 1, 2017

(54) SYSTEM AND METHOD FOR REDUCING POWER CONSUMPTION IN DETECTING SIGNAL FROM TARGET DEVICE

(71) Applicant: QUALCOMM Incorporated, San Diego, CA (US)

(72) Inventor: Shahar Gal, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/861,798

(22) Filed: Sep. 22, 2015

(65) Prior Publication Data

US 2017/0086141 A1 Mar. 23, 2017

(51) Int. Cl.
*H04W 4/00* (2009.01)
*H04W 52/02* (2009.01)
*H04L 12/26* (2006.01)

(52) U.S. Cl.
CPC ......... *H04W 52/0229* (2013.01); *H04L 43/16* (2013.01); *H04W 52/028* (2013.01); *H04W 52/0258* (2013.01)

(58) Field of Classification Search
CPC combination set(s) only.
See application file for complete search history.

(56) References Cited

U.S. PATENT DOCUMENTS

| | | | |
|---|---|---|---|
| 5,714,937 A | 2/1998 | Campana, Jr. | |
| 7,312,750 B2 | 12/2007 | Mao et al. | |
| 8,175,532 B2 | 5/2012 | Nanda et al. | |
| 8,704,711 B2 * | 4/2014 | Wang | H01Q 1/2291 342/359 |
| 8,831,127 B2 | 9/2014 | Nilsson et al. | |
| 2009/0290528 A1 | 11/2009 | Kwon et al. | |
| 2011/0117855 A1 * | 5/2011 | Salo | H04B 1/1027 455/63.4 |
| 2012/0014367 A1 | 1/2012 | Caillerie et al. | |
| 2012/0064841 A1 | 3/2012 | Husted et al. | |
| 2014/0072078 A1 | 3/2014 | Sergeyev et al. | |

OTHER PUBLICATIONS

International Search Report and Written Opinion—PCT/US2016/048489—ISA/EPO—Nov. 14, 2016.

* cited by examiner

*Primary Examiner* — Frank Duong
(74) *Attorney, Agent, or Firm* — Loza & Loza LLP

(57) ABSTRACT

An apparatus for wireless communications is disclosed. The apparatus includes a processing system configured to configure a subset of a plurality of RF receiver chains coupled to respective antennas to receive in an omnidirectional manner, the subset comprising at least one RF receiver chain of the plurality of RF receiver chains; determine a first energy level of at least one signal received via the subset while the subset of RF receiver chains is configured to receive in the omnidirectional manner; configure the plurality of RF receiver chains to directionally receive from a target device based on the first energy level; determine a second energy level of the at least one signal received via the RF receiver chains while the RF receiver chains are configured to directionally receive from the target device; and generate data from the at least one signal based on the second energy level.

30 Claims, 9 Drawing Sheets

SYSTEM AND METHOD FOR REDUCING POWER CONSUMPTION IN DETECTING SIGNAL FROM TARGET DEVICE

FIELD

This disclosure relates generally to wireless communications, and in particular, to a system and method for reducing power consumption in detecting signal from a target wireless device.

BACKGROUND

A wireless device having multiple-input-multiple-output (MIMO) capability may receive signals from remote devices in a directional manner using an array of antennas coupled to corresponding RF chains. An advantage of receiving signals in a directional manner is that higher gains or receiver sensitivity may be achieved as compared to receiving signals in an omnidirectional manner. A further advantage is that signals from unwanted wireless devices ("non-target devices") that are not situated within the target direction of the antenna array/RF chains are substantially attenuated to reduce signal interference from such devices.

A drawback associated with operating an antenna array/RF chains in a directional manner is that doing so consumes a relatively large amount of power. This is because many RF chains (e.g., 32) need to be operated in order to achieve the directional selectivity desired.

Often, a wireless device, which has its antenna array/RF chains configured in directional manner aimed at a target device, is waiting to receive another transmission from the target device. During such waiting period, the wireless device is consuming significant amount of power because its many RF chains are being operated to configure the antenna array in such directional manner.

Thus, there is a need to reduce power consumption while attempting to detect a signal from a target wireless device.

SUMMARY

Certain aspects of the present disclosure provide an apparatus for wireless communications. The apparatus comprises a processing system configured to: configure a subset of a plurality of RF receiver chains coupled to respective antennas to receive in an omnidirectional manner, the subset comprising at least one RF receiver chain of the plurality of RF receiver chains; determine a first energy level of at least one signal received via the subset while the subset of RF receiver chains is configured to receive in the omnidirectional manner; configure the plurality of RF receiver chains to directionally receive from a target device based on the first energy level; determine a second energy level of the at least one signal received via the RF receiver chains while the RF receiver chains are configured to directionally receive from the target device; and generate data from the at least one signal based on the second energy level.

Certain aspects of the present disclosure provide a method for wireless communications. The method comprises configuring a subset of a plurality of RF receiver chains coupled to respective antennas to receive in an omnidirectional manner, the subset comprising at least one RF receiver chain of the plurality of RF receiver chains; determining a first energy level of at least one signal received via the subset while the subset of RF receiver chains is configured to receive in the omnidirectional manner; configuring the plurality of RF receiver chains to directionally receive from a target device based on the first energy level; determining a second energy level of the at least one signal received via the RF receiver chains while the RF receiver chains are configured to directionally receive from the target device; and generating data from the at least one signal based on the second energy level.

Certain aspects of the present disclosure provide an apparatus for wireless communications. The apparatus comprises means for configuring a subset of a plurality of RF receiver chains coupled to respective antennas to receive in an omnidirectional manner, the subset comprising at least one RF receiver chain of the plurality of RF receiver chains; means for determining a first energy level of at least one signal received via the subset while the subset of RF receiver chains is configured to receive in the omnidirectional manner; means for configuring the plurality of RF receiver chains to directionally receive from a target device based on the first energy level; means for determining a second energy level of the at least one signal received via the RF receiver chains while the RF receiver chains are configured to directionally receive from the target device; and means for generating data from the at least one signal based on the second energy level.

Certain aspects of the present disclosure provide a computer readable medium having instructions stored thereon for configuring a subset of a plurality of RF receiver chains coupled to respective antennas to receive in an omnidirectional manner, the subset comprising at least one RF receiver chain of the plurality of RF receiver chains; determining a first energy level of at least one signal received via the subset while the subset of RF receiver chains is configured to receive in the omnidirectional manner; configuring the plurality of RF receiver chains to directionally receive from a target device based on the first energy level; determining a second energy level of the at least one signal received via the RF receiver chains while the RF receiver chains are configured to directionally receive from the target device; and generating data from the at least one signal based on the second energy level.

Certain aspects of the present disclosure provide a wireless node. The wireless node comprises a plurality of antennas; a plurality of RF receiver chains coupled to the plurality of antennas, respectively; and a processing system configured to: configure a subset of a plurality of RF receiver chains coupled to respective antennas to receive in an omnidirectional manner, the subset comprising at least one RF receiver chain of the plurality of RF receiver chains; determine a first energy level of at least one signal received via the subset while the subset of RF receiver chains is configured to receive in the omnidirectional manner; configure the plurality of RF receiver chains to directionally receive from a target device based on the first energy level; determine a second energy level of the at least one signal received via the RF receiver chains while the RF receiver chains are configured to directionally receive from the target device; and generate data from the at least one signal based on the second energy level.

DETAILED DESCRIPTION

Figure 1:
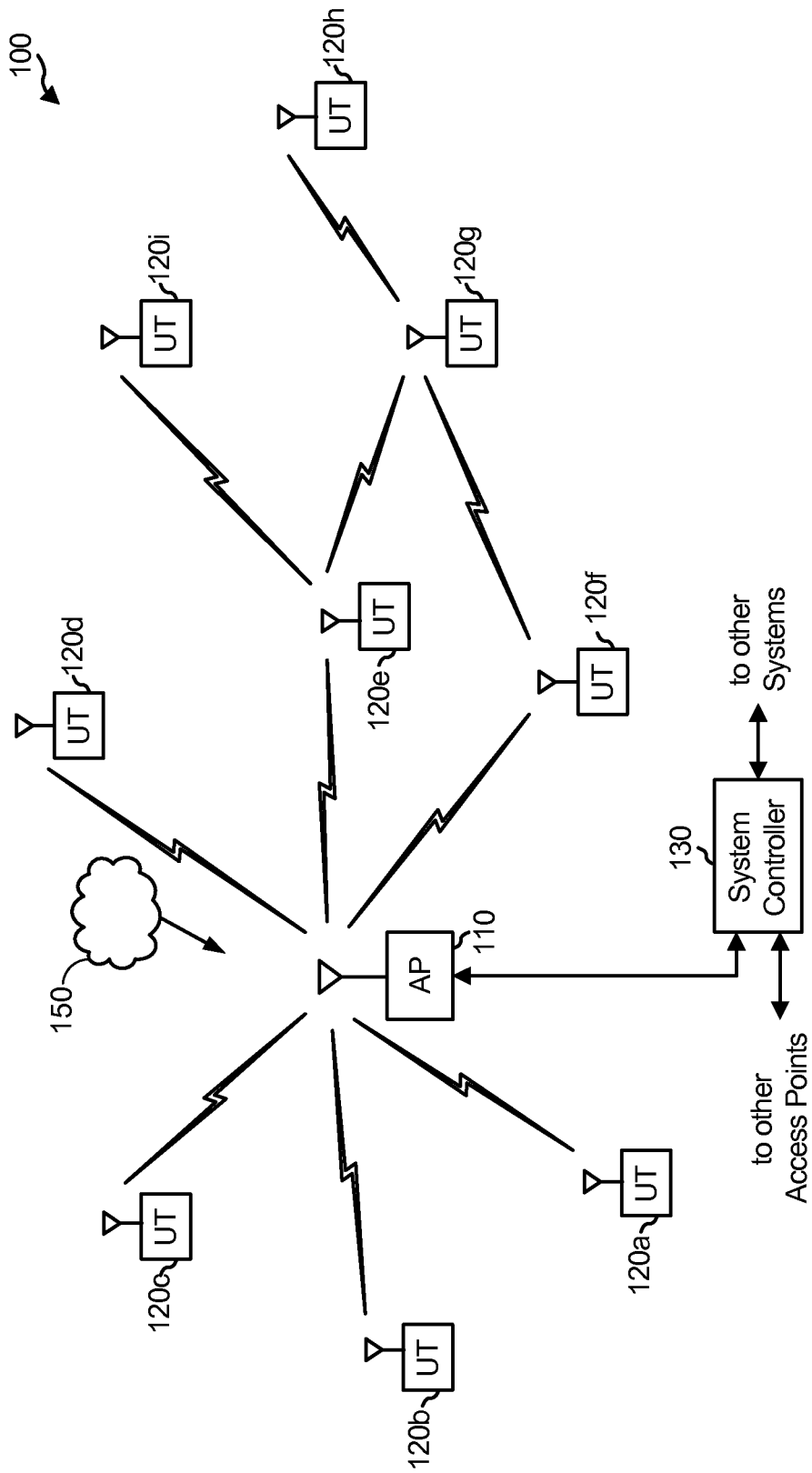
FIG. 1 illustrates a block diagram of an exemplary wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a block diagram of an example of a wireless communication system 100 with a plurality of wireless nodes, such as access points and access terminals. For simplicity, only one access point 110 is shown. An access point is generally a fixed station that communicates with access terminals and may also be referred to as a base station or some other terminology. An access terminal may be fixed or mobile, and may be referred to as a mobile station, a wireless device or some other terminology. Access point 110 may communicate with one or more access terminals 120a to 120i at any given moment on the downlink and uplink. The downlink (i.e., forward link) is the communication link from the access point to the access terminals, and the uplink (i.e., reverse link) is the communication link from the access terminals to the access point. An access terminal may also communicate peer-to-peer with another access terminal. A system controller 130 couples to and provides coordination and control for the access points. The access point 110 may communicate with other devices coupled to a backbone network 150.

Figure 2:
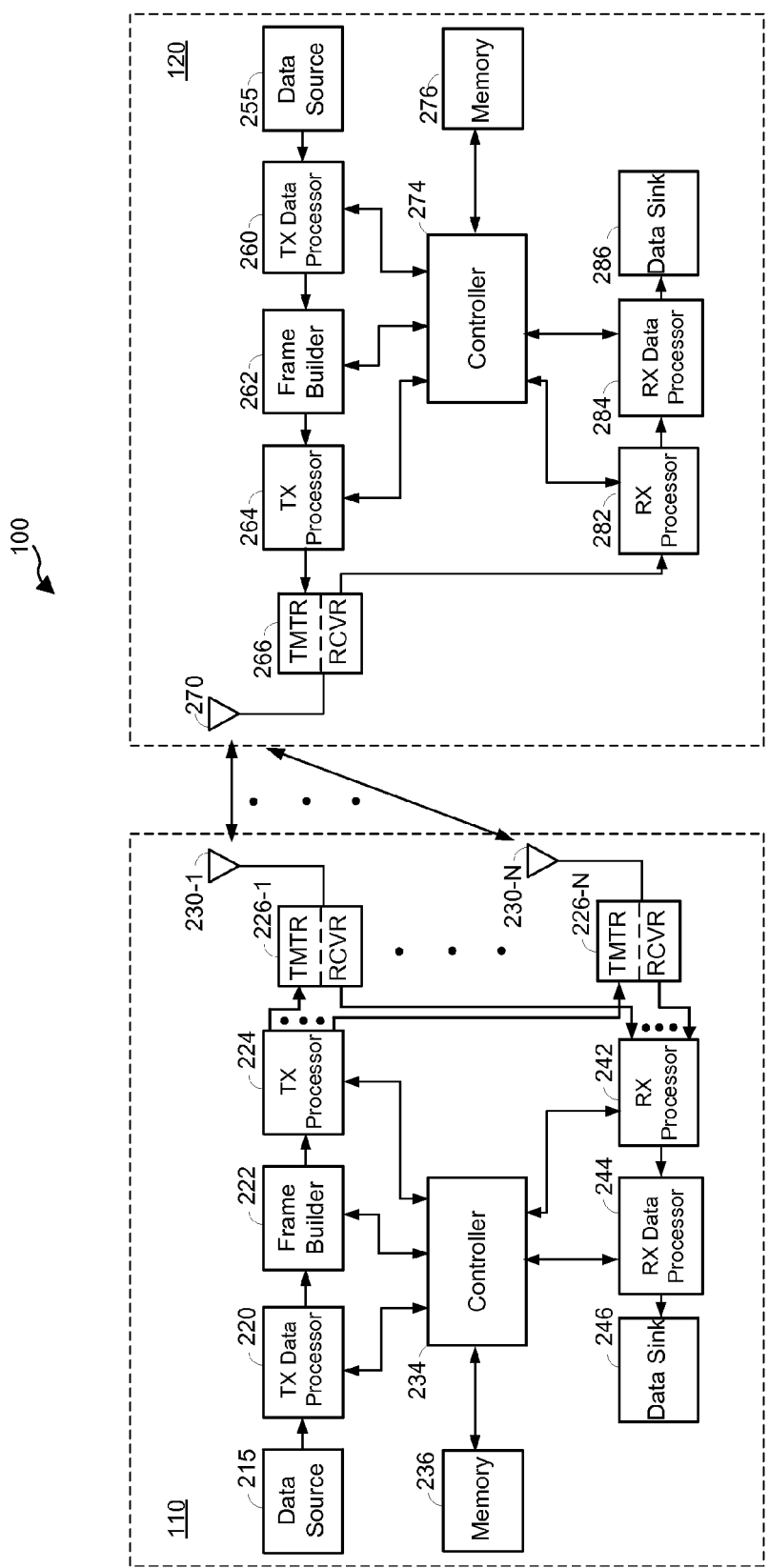
FIG. 2 illustrates a block diagram of an exemplary access point and access terminal in accordance with certain aspects of the present disclosure.

FIG. 2 illustrates a block diagram of an access point 110 (generally, a first wireless node) and an access terminal 120 (generally, a second wireless node) in the wireless communication system 100. The access point 110 is a transmitting entity for the downlink and a receiving entity for the uplink. The access terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel.

It shall be understood that the access point 110 may alternatively be an access terminal, and the access terminal 120 may alternatively be an access point.

For transmitting data, the access point 110 comprises a transmit data processor 220, a frame builder 222, a transmit processor 224, a plurality of transceivers 226-1 to 226-N, and a plurality of antennas 230-1 to 230-N. The access point 110 also comprises a controller 234 for controlling operations of the access point 110.

In operation, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode the data (e.g., using low-density parity check (LDPC) encoding) at any one of a plurality of different coding rates. Also, the transmit data processor 220 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 220 specifying which modulation and coding scheme (MCS) to use (e.g., based on channel conditions of the downlink), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

The frame builder 222 constructs a frame (also referred to as a packet), and inserts the data symbols into a data payload of the frame. The frame may include a preamble, a header, and the data payload. The preamble may include a short training field (STF) sequence and a channel estimation (CE) sequence to assist the access terminal 120 in receiving the frame. The header may include information related to the data in the payload such as the length of the data and the MCS used to encode and modulate the data. This information allows the access terminal 120 to demodulate and decode the data. The data in the payload may be divided among a plurality of blocks, wherein each block may include a portion of the data and a guard interval (GI) to assist the receiver with phase tracking. The frame builder 222 outputs the frame to the transmit processor 224.

The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode. The transmit processor 224 may apply a spectrum mask to the frame so that the frequency constituent of the downlink signal meets certain spectral requirements.

In certain aspects, the transmit processor 224 may support multiple-output-multiple-input (MIMO) transmission. In these aspects, the access point 110 may include multiple antennas 230-1 to 230-N and multiple transceivers 226-1 to 226-N (e.g., one for each antenna). The transmit processor 224 may perform spatial processing on the incoming frames and provide a plurality of transmit frame streams for the plurality of antennas. The transceivers 226-1 to 226-N receive and processes (e.g., converts to analog, amplifies, filters, and frequency upconverts) the respective transmit frame streams to generate transmit signals for transmission via the antennas 230-1 to 230-N, respectively.

For transmitting data, the access terminal 120 comprises a transmit data processor 260, a frame builder 262, a transmit processor 264, a transceiver 266, and one or more antennas 270 (for simplicity one antenna is shown). The access terminal 120 may transmit data to the access point 110 on the uplink, and/or transmit data to another access terminal (e.g., for peer-to-peer communication). The access terminal 120 also comprises a controller 274 for controlling operations of the access terminal 120.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a data payload of the frame. The frame may include a preamble, a header, and the data payload. The preamble may include an STF sequence and a CE sequence to assist the access point 110 and/or other access terminal in receiving the frame. The header may include information related to the data in the payload such as the length of the data and the MCS used to encode and modulate the data. The data in the payload may be divided among a plurality of blocks where each block may include a portion of the data and a guard interval (GI) assisting the access point and/or other access terminal with phase tracking. The frame builder 262 outputs the frame to the transmit processor 264.

The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode. The transmit processor 264 may apply a spectrum mask to the frame so that the frequency constituent of the uplink signal meets certain spectral requirements.

The transceiver 266 receives and processes (e.g., converts to analog, amplifies, filters, and frequency upconverts) the output of the transmit processor 264 for transmission via the one or more antennas 270. For example, the transceiver 266 may upconvert the output of the transmit processor 264 to a transmit signal having a frequency in the 60 GHz range.

In certain aspects, the transmit processor 264 may support multiple-output-multiple-input (MIMO) transmission. In these aspects, the access terminal 120 may include multiple antennas and multiple transceivers (e.g., one for each antenna). The transmit processor 264 may perform spatial processing on the incoming frame and provide a plurality of transmit frame streams for the plurality of antennas. The transceivers receive and processes (e.g., converts to analog, amplifies, filters, and frequency upconverts) the respective transmit frame streams to generate transmit signals for transmission via the antennas.

For receiving data, the access point 110 comprises a receive processor 242, and a receive data processor 244. In operation, the transceivers 226-1 to 226-N receive a signal (e.g., from the access terminal 120), and spatially process (e.g., frequency downconverts, amplifies, filters and converts to digital) the received signal.

The receive processor 242 receives the outputs of the transceivers 226-1 to 226-N, and processes the outputs to recover data symbols. For example, the access point 110 may receive data (e.g., from the access terminal 120) in a frame. In this example, the receive processor 242 may detect the start of the frame using the STF sequence in the preamble of the frame. The receiver processor 242 may also use the STF for automatic gain control (AGC) adjustment. The receive processor 242 may also perform channel estimation (e.g., using the CE sequence in the preamble of the frame) and perform channel equalization on the received signal based on the channel estimation.

Further, the receive processor 242 may estimate phase noise using the guard intervals (GIs) in the payload, and reduce the phase noise in the received signal based on the estimated phase noise. The phase noise may be due to noise from a local oscillator in the access terminal 120 and/or noise from a local oscillator in the access point 110 used for frequency conversion. The phase noise may also include noise from the channel. The receive processor 242 may also recover information (e.g., MCS scheme) from the header of the frame, and send the information to the controller 234. After performing channel equalization and/or phase noise reduction, the receive processor 242 may recover data symbols from the frame, and output the recovered data symbols to the receive data processor 244 for further processing.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the access terminal 120 may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 110 includes multiple antennas 230-1 to 230-N and multiple transceivers 226-1 to 226-N (e.g., one for each antenna). Each transceiver receives and processes (e.g., frequency downconverts, amplifies, filters, frequency upconverts) the signal from the respective antenna. The receive processor 242 may perform spatial processing on the outputs of the transceivers 226-1 to 226-N to recover the data symbols.

For receiving data, the access terminal 120 comprises a receive processor 282, and a receive data processor 284. In operation, the transceiver 266 receives a signal (e.g., from the access point 110 or another access terminal), and processes (e.g., frequency downconverts, amplifies, filters and converts to digital) the received signal.

The receive processor 282 receives the output of the transceiver 266, and processes the output to recover data symbols. For example, the access terminal 120 may receive data (e.g., from the access point 110 or another access terminal) in a frame, as discussed above. In this example, the receive processor 282 may detect the start of the frame using the STF sequence in the preamble of the frame. The receive processor 282 may also perform channel estimation (e.g., using the CE sequence in the preamble of the frame) and perform channel equalization on the received signal based on the channel estimation.

Further, the receiver processor 282 may estimate phase noise using the guard intervals (GIs) in the payload, and reduce the phase noise in the received signal based on the estimated phase noise. The receive processor 282 may also recover information (e.g., MCS scheme) from the header of the frame, and send the information to the controller 274. After performing channel equalization and/or phase noise reduction, the receive processor 282 may recover data symbols from the frame, and output the recovered data symbols to the receive data processor 284 for further processing.

The receive data processor 284 receives the data symbols from the receive processor 282 and an indication of the corresponding MSC scheme from the controller 274. The receiver data processor 284 demodulates and decodes the data symbols to recover the data according to the indicated MSC scheme, and outputs the recovered data (e.g., data bits) to a data sink 286 for storage and/or further processing.

As discussed above, the access point 110 or another access terminal may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 120 may include multiple antennas and multiple transceivers (e.g., one for each antenna). Each transceiver receives and processes (e.g., frequency downconverts, amplifies, filters, frequency upconverts) the signal from the respective antenna. The receive processor 282 may perform spatial processing on the outputs of the transceivers to recover the data symbols.

As shown in FIG. 2, the access point 110 also comprises a memory 236 coupled to the controller 234. The memory 236 may store instructions that, when executed by the controller 234, cause the controller 234 to perform one or more of the operations described herein. Similarly, the access terminal 120 also comprises a memory 276 coupled to the controller 274. The memory 276 may store instructions that, when executed by the controller 274, cause the controller 274 to perform the one or more of the operations described herein.

Figure 3A:
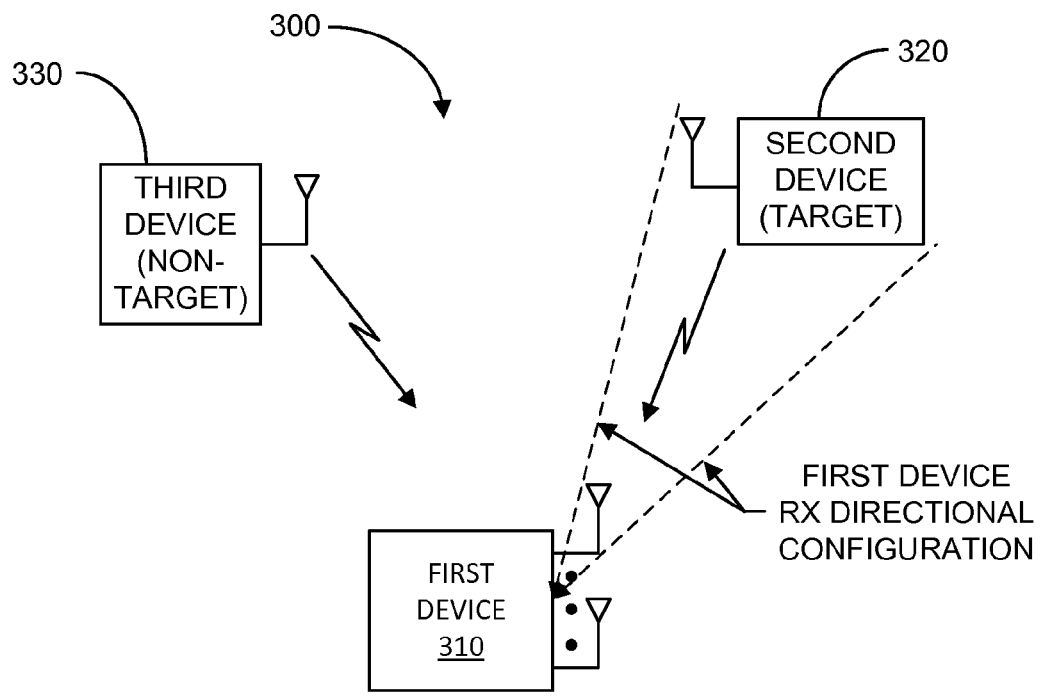
FIGS. 3A-3B illustrate block diagrams of an exemplary communication system including a first wireless device configured to receive signals in directional and omnidirectional manners, respectively, in accordance with certain aspects of the present disclosure.

FIG. 3 illustrates a block diagram of an exemplary communication system 300 including a first wireless device 310, a second wireless device 320, and a third wireless device 330. The first wireless device 310 has configured its antenna-RF chain array to directionally receive signals from a target wireless device (e.g., the second wireless device 320), as indicated by the receive beamforming represented by a pair of diverging dashed lines. In such configuration, the antenna-RF chain array has a relatively high gain ("an array gain") in order to detect the signal from the second wireless device 320 with improved RF sensitivity and higher signal-to-noise ratio (SNR). Additionally, because of the directional selectivity of the antenna-RF chain array, unwanted signals from a non-target wireless device (e.g., the third wireless device 330) situated outside of the directional selectivity of the antenna-RF chain array may be substantially attenuated to reduce interference.

However, one of the problems with operating an antenna-RF chain array in a directional manner is that it requires a substantial amount of power. This is because a large number of RF chains (e.g., 32) need to be turned on and set to configure the antenna-RF chain array in directional mode. This is better explained with reference to FIG. 4.

Figure 4:
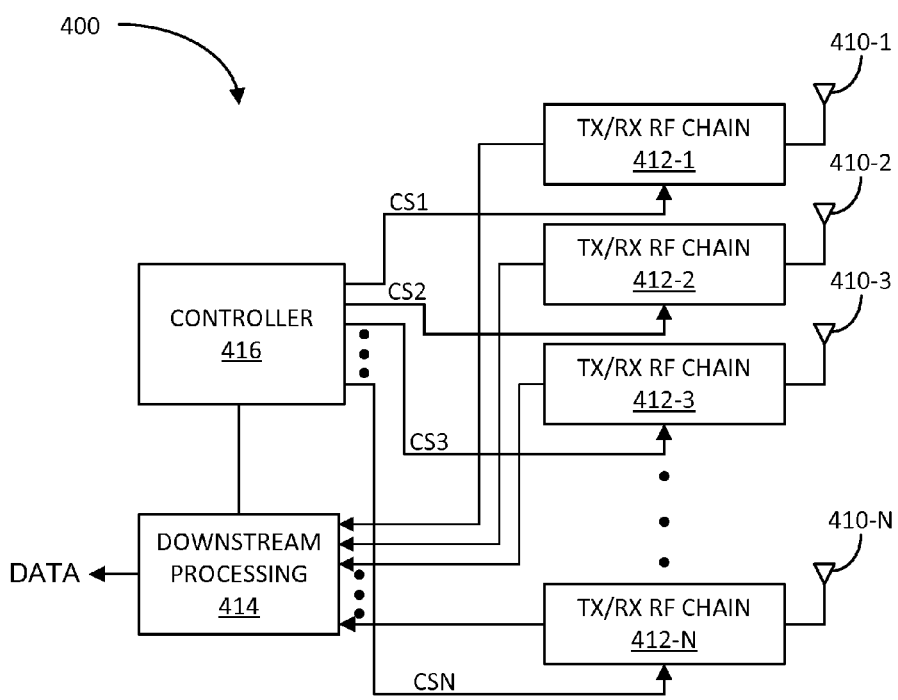
FIG. 4 illustrates a block diagram of an exemplary receiver in accordance with certain aspects of the present disclosure.

FIG. 4 illustrates a block diagram of an exemplary wireless device 400 in accordance with another aspect of the disclosure. The wireless device 400 may be an exemplary detailed implementation of the first wireless device 310 previously discussed. The wireless device 400 comprises an antenna-RF chain array including a plurality of transceiver (Tx/Rx) RF chains 412-1 to 412-N (e.g., N=32) coupled to antennas 410-1 to 410-N, respectively. The outputs of the RF chains 412-1 to 412-N are sent to a downstream processing component 414 to further process the received signal including processing the received frame to generate the frame data. The downstream processing component 414 may comprise the RX processor 242 and RX data processor 244 previously discussed. The wireless device 400 includes a controller 416 to configure the RF chains 412-1 to 412-N using control signals CS1 to CSN to directionally receive signals from a target device, such as the second wireless device 320.

Because a large number of RF chains 412-1 to 412-N (e.g., N=32) may need to be operated to directionally receive a signal from a target device, operating the RF chains in this manner while waiting to receive the next frame from the target device consumes a substantial amount of power, which may be undesirable.

Figure 3B:
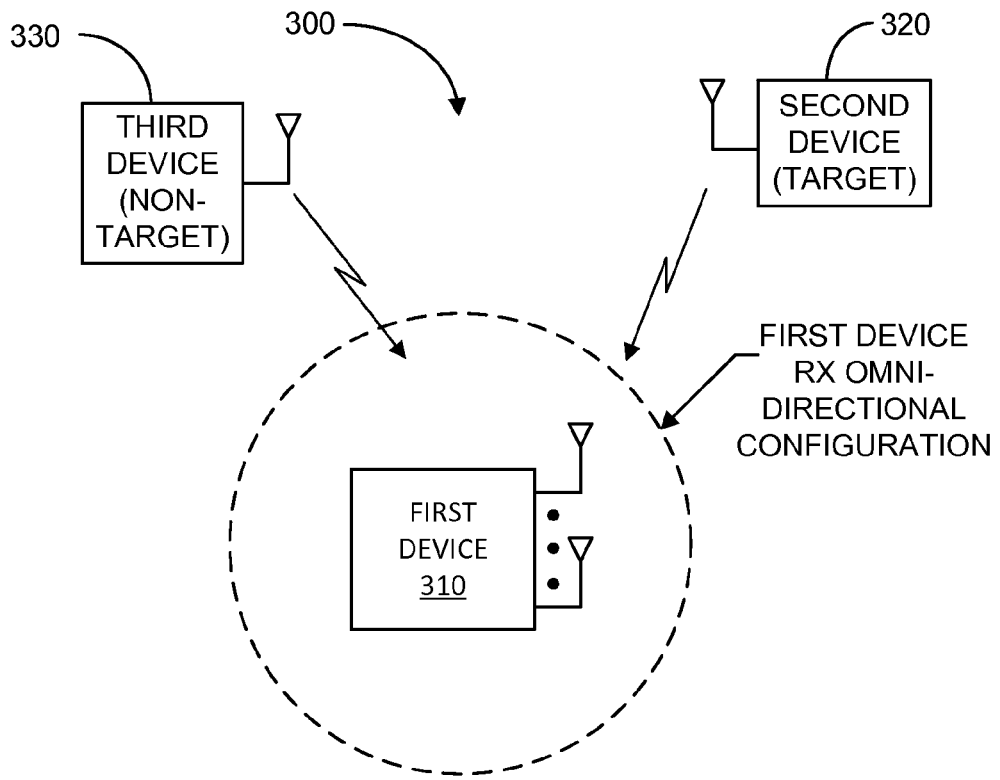

An alternative approach is to operate only a single antenna/RF chain or a few of them (e.g., 1-3 RF chains) to configure the antenna(s)-RF chain(s) for omnidirectional detection. This is illustrated in FIG. 3B. As represented by the dashed circle, the first wireless device 310 is configured to receive signals in an omnidirectional manner. Thus, the first wireless device 310 is able to receive signals from the target device, such as the second wireless device 320, and non-target devices, such as the third wireless device 330.

Operating the antenna(s)-RF chain(s) in omnidirectional mode while waiting to detect a next frame from the target device would appear to consume less power as a smaller number of RF chain(s) (e.g., 1-3 chains) are operated. However, the first wireless device 310 may spend substantial amount of power detecting false positives; that is, detecting and decoding frames coming from non-target devices. Thus, a better solution is needed for detecting frames from a target device while consuming less power.

To address this issue, a wireless device configures its antenna(s)-RF chain(s) for omnidirectional detection while attempting to detect a signal from a target device. When a signal is detected having a first energy level at or above a first energy threshold, the wireless device re-configures its antenna-RF chain array in directional mode aimed at the target device.

While in directional mode, if the energy level ("second energy level") of the signal increases or is at or above a second energy threshold (e.g., the second energy threshold being related to the expected energy of a received signal from the target device), then the signal is most likely from the target device, and the wireless device may receive a frame associated with the signal. If, on the other hand, the second energy level is below the first energy level or below the second energy threshold, then the signal is most likely from a non-target device, and the wireless device may ignore the signal and subsequently reconfigure its antenna(s)-RF chain(s) for omnidirectional detection. This technique is better explained with reference to the following more detailed description.

Figure 5:
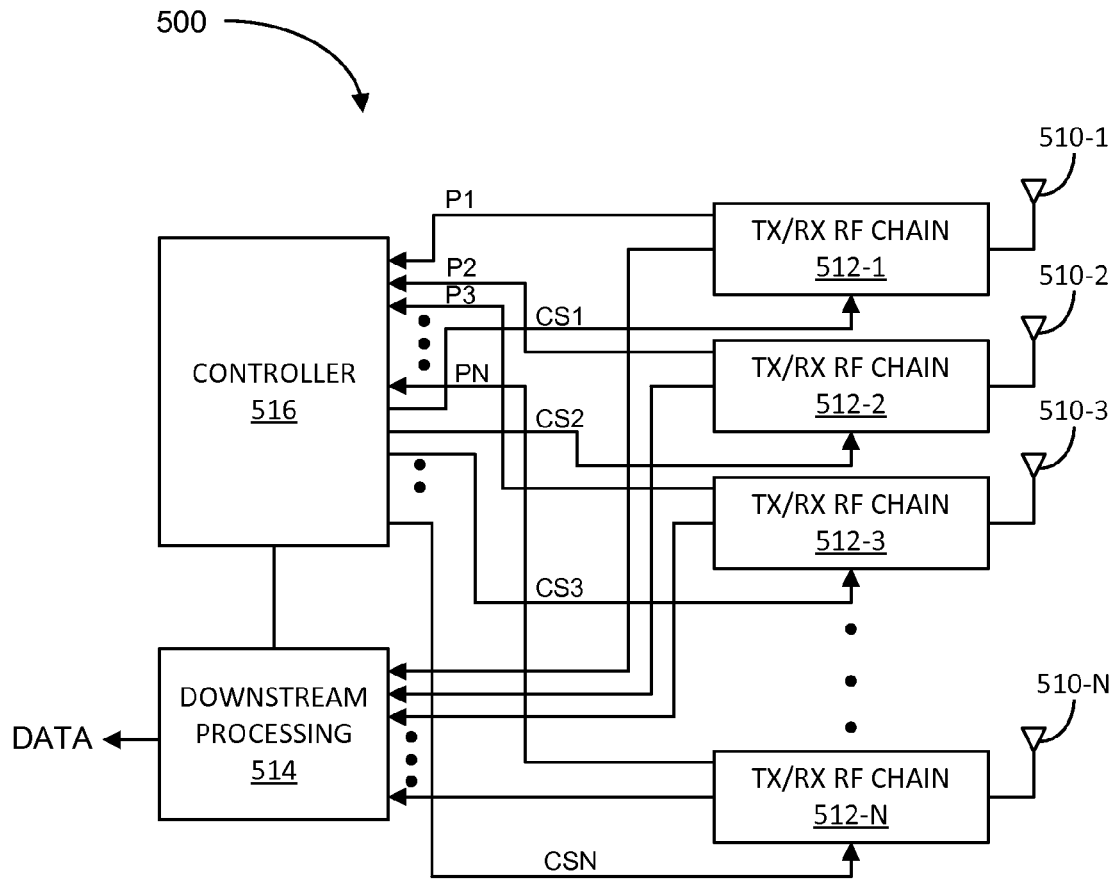
FIG. 5 illustrates a block diagram of another exemplary receiver in accordance with certain aspects of the present disclosure.

FIG. 5 illustrates an exemplary wireless device 500 in accordance with another aspect of the present disclosure. The wireless device 500 may be an exemplary detailed implementation of the first wireless device 310 previously discussed. The wireless device 500 comprises an antenna-RF chain array including a plurality of transceiver (Tx/RX) RF chains 512-1 to 512-N coupled to antennas 510-1 to 510-N, respectively. The wireless device 500 further comprises a downstream processing component 514 and a controller 516. The controller 516 may configure the RF chains 512-1 to 512-N in directional mode by sending control signals CS1 to CSN to the corresponding RF chains. Similarly, the controller 516 may configure the RF chains 512-1 to 512-N in omnidirectional mode by enabling and configuring a single or a small number (<<N) of RF chains using the control signals CS1 to CSN.

The controller 516 receives signal energy (power) indications P1 to PN of the detected signal received via the RF chains 512-1 to 512-N, respectively. The received signals from the RF chains 512-1 to 512-N are provided to the downstream processing component 514 for further processing including processing a frame to output frame data. The downstream processing component 514 may comprise the RX processor 242 and RX data processor 244 previously discussed.

Figure 6:
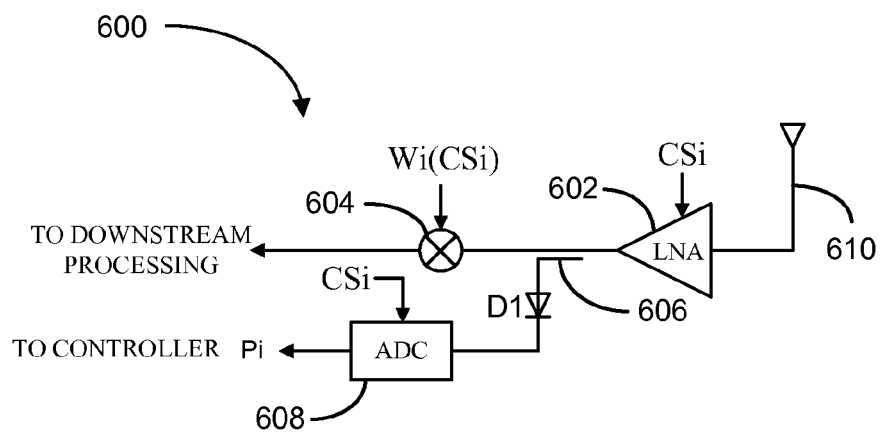
FIG. 6 illustrates a schematic diagram of an exemplary receiver chain in accordance with certain aspects of the present disclosure.

FIG. 6 illustrates a schematic diagram of an exemplary receiver chain 600 in accordance with another aspect of the present disclosure. The receiver chain 600 may comprise a low noise amplifier (LNA) 602, a mixer 604, a coupler 606, a diode D1, and an analog-to-digital converter (ADC) 608. The LNA 602 amplifies a signal received by way of an antenna 610.

The mixer 604 downconverts the amplified signal generated by the LNA 602 based on a local oscillator (LO) signal Wi(CSi). The LO signal Wi is a function of the control signal CSi for configuring the RF chain, along with other RF chains, for receiving signals in a directional manner. That is, the phase of the LO signal Wi, as dictated by the control signal CSi, may be selected in relationship with the phases of other LO signals applied to other similar RF chains to configure the antenna-RF chain array to receive signals in a directional manner. The LO signal Wi, as a function of the control signal CSi, may be selected by itself or with one or more other LO signals applied to other similar RF chains to configure a subset of the antennas 510-1 to 510-N to receive signals in an omnidirectional manner. The output of the mixer 604, which may be an intermediate frequency (IF) signal or a baseband signal, may be sent to the downstream processing component 514 for further processing as discussed above.

For measuring an energy of the signal received by way of the antenna 610, the coupler 606 couples a portion of the amplified signal at the output of the LNA 602. The diode D1 generates a signal indicative of the energy of the received signal based on the coupled portion of the signal from the coupler 606. The ADC 608 converts or conditions the energy-indicating signal from the diode D1 to a signal Pi that can be received and processed by the controller 516. It shall be understood that the ADC 608 may perform other functions, in addition to simply converting the energy-indicating signal into digital form, in order to configure the energy signal Pi for processing by the controller 516. Such other functions may include amplification, filtering, noise reduction processing, etc.

As discussed further herein, the controller 516 may use the energy-indicating signal Pi for detecting a signal when one or more of the antennas/RF chains are configured to receive signals in an omnidirectional manner. The controller 516 may use the energy-indicating signal Pi to determine whether the signal is likely from a target device or likely from a non-target device. In such case, the antenna-RF chain array may be configured to receive signals in a directional manner aimed at the target device, as discussed in more detail herein.

To effectively disable the RF chain, the controller 516 may configure the control signal CSi to disable the LNA 602, ADC 608 or other associated devices so that these devices consume substantially no power or lower power than would otherwise consume if the RF chain was enabled.

Figure 7:
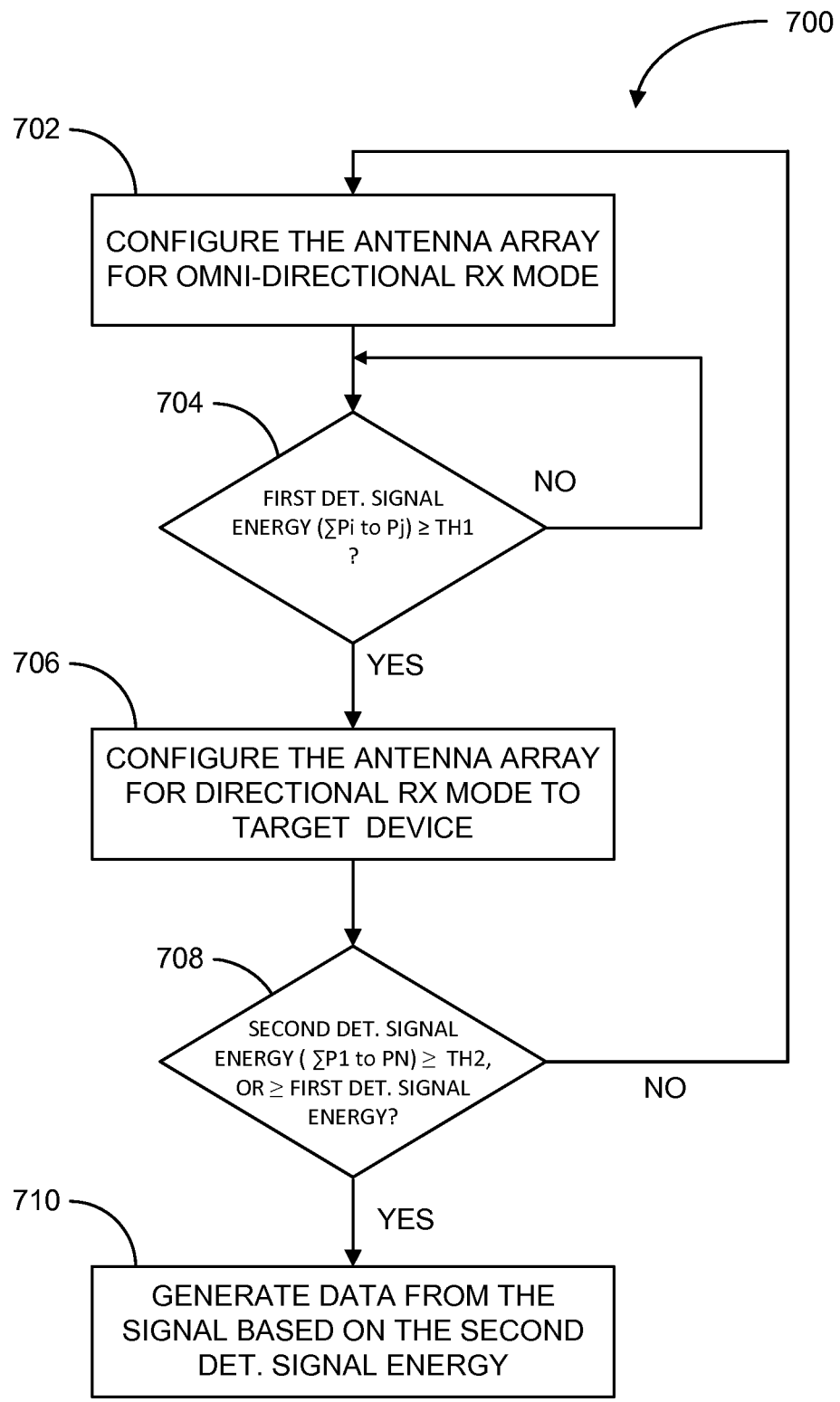
FIG. 7 illustrates a flow diagram of an exemplary method of detecting a signal from a target device in accordance with certain aspects of the disclosure.

FIG. 7 illustrates a flow diagram of an exemplary method 700 of determining whether a received signal is from a target device in accordance with another aspect of the present disclosure. According to the method 700, the controller 516 configures one or more of the antennas/RF chains to receive signals in omnidirectional mode via the control signals CS1 to CSN (block 702). This may be done by enabling and configuring a selected small number of RF chain(s) 512-$i$ to 512-$j$ (where i=j if a single RF chain is selected; and i to j need not be consecutive).

Then, according to the method 700, the controller 516 determines whether the first energy level of the detected signal ($\Sigma$(Pi to Pj)) from the selected RF chain(s) 512-$i$ to 512-$j$ is at or above a first threshold (TH1) (block 704). If the first energy level of the detected signal is below the first threshold, then the energy received is more likely from a non-target device(s). In such a case, the controller 516 returns to block 704 to attempt to detect another signal in omnidirectional mode. In such omnidirectional mode, the power consumed by the wireless device 500 is relatively small because a small number of RF chains are being operated (e.g., 1-3 RF chains).

If, in block 704, the controller 516 determines that the first energy level ($\Sigma$(Pi to Pj)) of the detected signal is at or above the first threshold (TH1), the controller 516 configures the antenna-RF chain array to receive signals in a directional manner aimed at the target device via the control signals CS1 to CSN (block 706).

Then, according to the method 700, the controller 516 determines whether the second energy level of the detected signal ($\Sigma$(P1 to PN)) from the RF chains 512-1 to 512-N is at or above a second threshold (TH2) or is greater than the first energy level (block 708). If the second energy level is lower than the second threshold (TH2) or lower than the first energy level, then the detected signal is more likely from a non-target device. In such a case, the controller 516 returns to block 702 to re-configure the one or more antenn(a)/RF chain(s) array in omnidirectional mode.

If, in block 708, the controller 516 determines that the second energy level ($\Sigma$(P1 to PN)) of the received signal is at or above the second threshold (TH2) or greater than the first energy level, the controller 516 generates data by decoding the signal received from the target device (block 710). As discussed further herein, this may entail determining whether the detected signal complies with a certain protocol, and, if so, decoding at least a portion of a frame associated with the received signal to determine whether the signal is from the target device. If the signal is from the target device, the controller 516 instructs the downstream processing component 514 to receive and process the frame to extract the data from the frame.

In summary, to conserve power, the controller 516 operates the antenna-RF chain array in omnidirectional mode (lower power consumption) for initial detection of a signal, and operates the antenna-RF chain array in directional mode aimed at the target (higher power consumption) to determine whether the signal comes from a target device or a non-target device.

Figure 8A:
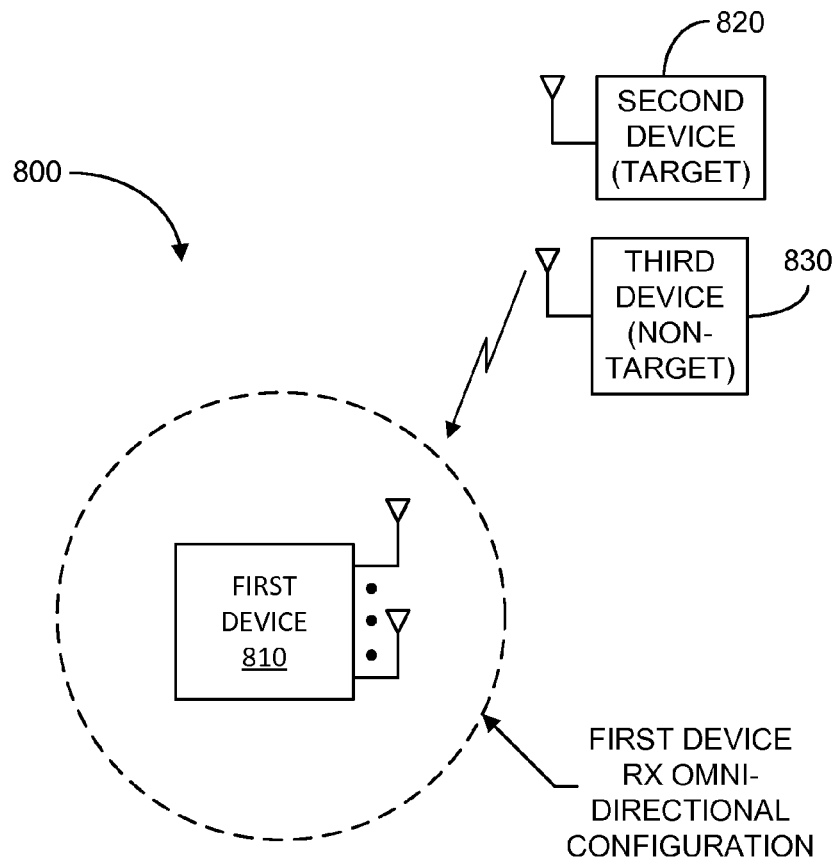
FIGS. 8A-8B illustrate block diagrams of an exemplary communication system including a first wireless device configured to receive signals in directional and omnidirectional manners, respectively, in accordance with certain aspects of the present disclosure.

FIG. 8A illustrates a block diagram of another exemplary communication system 800 in accordance with another aspect of the present disclosure. In some cases, a non-target device may be situated generally in the same direction as a target device from a perspective of device receiving signals from the target device. The communication system 800 illustrates such a case.

In particular, the communication system 800 comprises a first wireless device 810, a second wireless device 820, and a third wireless device 830. In this example, the second wireless device 820 is a target device from which the first wireless device 810 intends to receive signals. The third wireless device 830 is a non-target device from which the first wireless device 810 does not intend to receive signals. Further, in accordance with this example, the second wireless device 820 and the third wireless devices 830 are situated near each other and generally in the same direction from the perspective of the first wireless device 810. Additionally, according to this example, the third wireless device 830 (non-target) is transmitting a signal not intended for the first wireless device 810, and the second wireless device 820 (target) is not transmitting a signal.

If the first wireless device 810 implements the method 700 of determining whether the signal is from the second device 820 (target), the first wireless device 810 may need to implement further operations to determine whether the signal is from the target device. For instance, in the example given with respect to FIG. 8A, the first wireless device 810 may configure its antenna(s)/RF chain(s) to receive signals in an omnidirectional manner and determine that the detected signal from the third wireless device 830 (non-target) is above the first threshold (TH1) in accordance with block 704 of method 700.

Figure 8B:
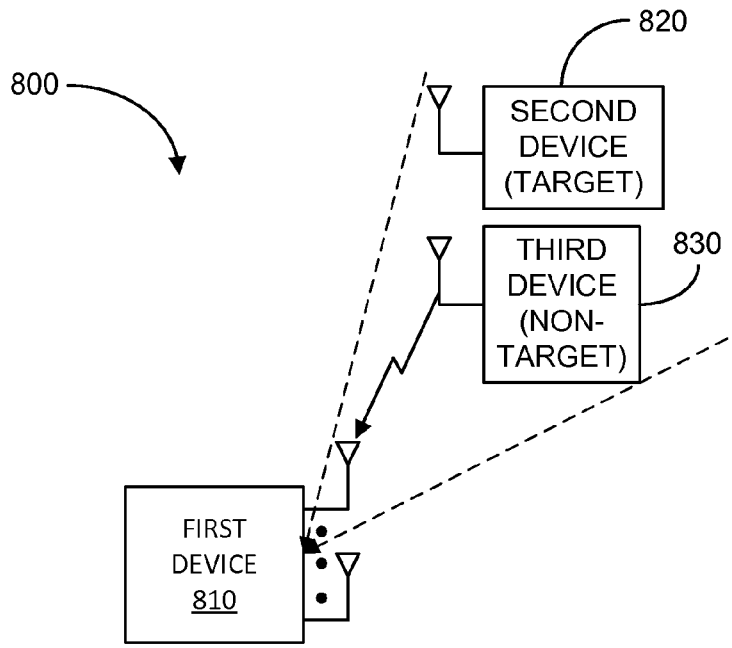

Additionally, as illustrated in FIG. 8B, the first wireless device 810 may configure its antennas/RF chains to receive signals in a directional manner aimed at the second wireless device 820 (target), and determine that the detected signal from the third wireless device 830 (non-target) is above the second threshold (TH2) or greater than the signal energy detected while configured in omnidirectional mode, in accordance with block 708 of method 700.

Thus, if the non-target device is located in the same direction as the target device, the first wireless device 810 needs to perform one or more additional operations to determine whether the detected signal is indeed from the target device. Examples of such one or more additional operations are discussed below.

Figure 9:
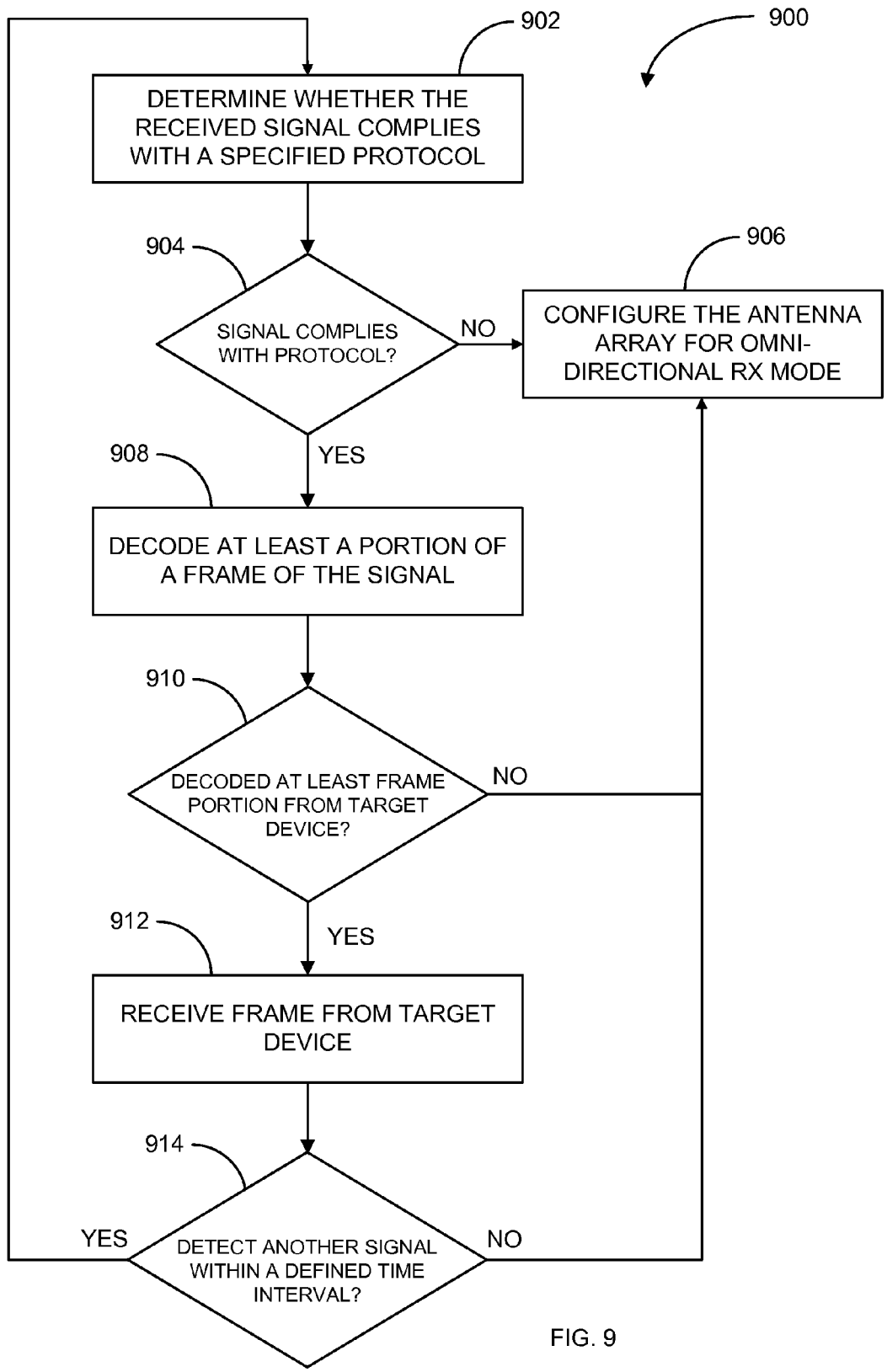
FIG. 9 illustrates a flow diagram of an exemplary method of detecting and receiving a signal from a target device in accordance with certain aspects of the disclosure.

FIG. 9 illustrates a flow diagram of an exemplary method 900 of determining whether a signal is from a target device in accordance with another aspect of the present disclosure. The method 900 may be an exemplary more detailed implementation of the operation of generating data by decoding the signal from the target device as indicated in block 710 of method 700. The first wireless device 810 may be configured similar to wireless device 500 previously discussed. Thus, the following discussion is with reference to wireless device 500 performing the method 900.

In particular, according to the method 900, the controller 516 determines whether the received signal complies with a specified protocol (block 902). For example, the controller 516 may determine whether the signal complies with a signal protocol, such as 802.11ad (or 802.11ay, which is under development) specified by the Institute of Electrical and Electronic Engineers (IEEE) or some other standards organization. In this regards, the controller 516 may cause the downstream processing component 514 to process at least a portion of the received signal to determine whether the signal complies with the specified protocol. More specifically, with regard to IEEE 802.11ad protocol, the downstream processing component 514 may process at least a portion of the received signal to determine whether a preamble (STF and CE) or other portion of a frame is present in the received signal.

If, in block 904, the controller 516 determines that the received signal does not comply with the specified signal protocol, then the received signal is likely from a non-target device. Accordingly, in response, the controller 516 configures the selected RF chain(s) 512-$i$ to 512-$j$ to receive signals in an omnidirectional mode for detecting a signal from the target device (block 906).

If, on the other hand, the controller 516 determines that the received signal complies with the specified protocol pursuant to block 904, the controller 516 instructs the downstream processing component 514 to decode at least a portion of a frame associated with the received signal (block 908). The controller 516 then determines whether the decoded at least portion of the frame is intended or addressed to the wireless device 500 (block 910). If the controller 516 determines that the frame is not intended for or addressed to the wireless device 500 in block 910, the controller 516 configures the selected RF chain(s) 512-$i$ to 512-$j$ to receive signals in an omnidirectional mode for detecting a signal from the target device (block 906).

If, on the other hand, the controller 516 determines that the frame is intended for or addressed to the wireless device 500, the controller 516 instructs the downstream processing component 514 to decode the frame to extract the data from the frame (block 912). The controller 516 may then wait a defined time interval to detect another signal (block 914). If the controller 516 does not detect another signal within the defined time interval in block 914, the controller 516 configures the selected RF chain(s) 512-$i$ to 512-$j$ to receive signals in an omnidirectional mode for detecting a signal from the target device (block 906). If, on the other hand, the controller 516 detects another signal within the defined time interval in block 914, the controller 516 returns to block 902 to assess whether the detected signal is from the target device.

Figure 10:
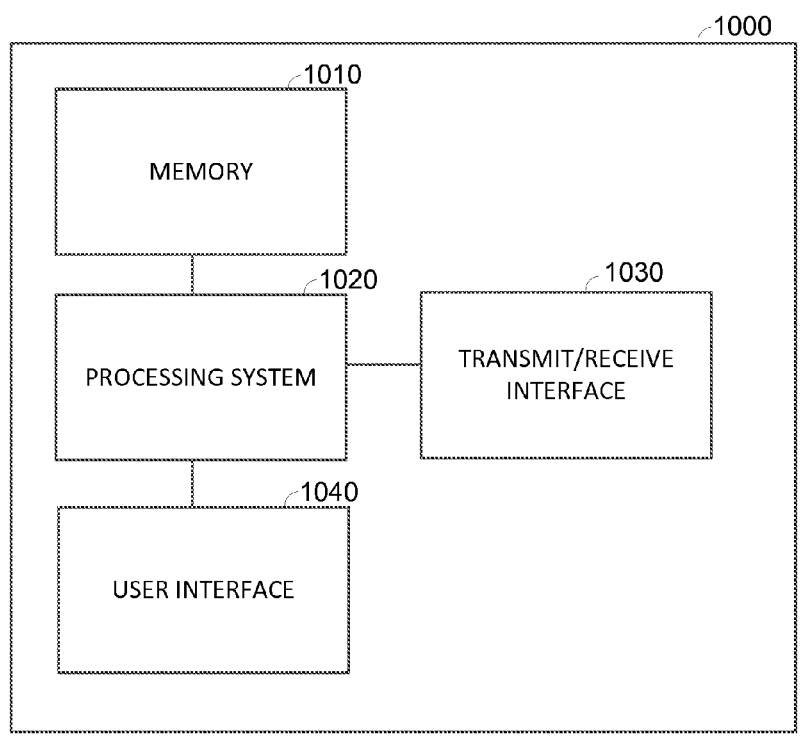
FIG. 10 illustrates a block diagram of an exemplary device in accordance with certain aspects of the present disclosure.

FIG. 10 illustrates an example device 1000 according to certain aspects of the present disclosure. The device 1000 may be configured to operate in an access point (e.g., access point 110) or an access terminal (e.g., access terminal) and to perform one or more of the operations described herein. The device 1000 includes a processing system 1020, and a memory 1010 coupled to the processing system 1020. The memory 1010 may store instructions that, when executed by the processing system 1020, cause the processing system 1020 to perform one or more of the operations described herein. Exemplary implementations of the processing system 1020 are provided below. The device 1000 also comprises a transmit/receiver interface 1030 coupled to the processing system 1020. The interface 1030 (e.g., interface bus) may be configured to interface the processing system 1020 to a radio frequency (RF) front end (e.g., transceivers 226-1 to 226-N, 266, RF chains 412-1 to 412-N, and RF chains 512-1 to 512-N), as discussed further below.

In certain aspects, the processing system 1020 may include one or more of the following: a transmit data processor (e.g., transmit data processor 220 or 260), a frame builder (e.g., frame builder 222 or 262), a transmit processor (e.g., transmit processor 224 or 264) and/or a controller (e.g., controller 234 or 274) for performing one or more of the operations described herein. In these aspects, the processing system 1020 may generate a frame and output the frame to an RF front end (e.g., transceiver 226 or 266) via the interface 1030 for wireless transmission (e.g., to an access point or an access terminal).

In certain aspects, the processing system 1020 may include one or more of the following: a downstream processing component (e.g., 414 or 514), receive processor (e.g., receive processor 242 or 282), a receive data processor (e.g., receive data processor 244 or 284) and/or a controller (e.g., controller 234, 274, 416, or 516) for performing one or more of the operations described herein. In these aspects, the processing system 1020 may receive a frame from an RF front end (e.g., transceivers 226 and 266, RF chains 412-1 to 412-N, or RF chains 512-1 to 512-N) via the interface 1030 and process the frame according to any one or more of the aspects discussed above.

In the case of an access terminal 120, the device 1000 may include a user interface 1040 coupled to the processing system 1020. The user interface 1040 may be configured to receive data from a user (e.g., via keypad, mouse, joystick, etc.) and provide the data to the processing system 1020. The user interface 1040 may also be configured to output data from the processing system 1020 to the user (e.g., via a display, speaker, etc.). In this case, the data may undergo additional processing before being output to the user. In the case of an access point 110, the user interface 1040 may be omitted.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For instance, the controller 516 and processing system 1020 are each examples of means for configuring a subset of a plurality of RF receiver chains coupled to respective antennas to receive in an omnidirectional manner. The controller 516, coupler 606, diode D1, and ADC 608, and processing system 1020 are each examples of means for determining a first energy level of at least one signal received via the subset while the subset of RF receiver chains is configured to receive in the omnidirectional manner. The controller 516 and processing system 1020 are each examples of means for configuring the plurality of RF receiver chains to directionally receive from a target device based on the first energy level. The controller 516, coupler 606, diode D1, ADC 608, and processing system 1020 are each examples of means for determining a second energy level of the at least one signal received via the RF receiver chains while the RF receiver chains are configured to directionally receive from the target device. The downstream processing component 514 and processing system 1020 are each examples of means for generating data from the at least one signal based on the second energy level.

The controller 516 and processing system 1020 are each examples of means for determining that the first energy level is equal to or greater than a first threshold energy level. The controller 516 and processing system 1020 are each examples of means for determining that the second energy level is equal to or greater than a second threshold energy level. The controller 516 and processing system 1020 are each examples of means for reconfiguring the subset of the RF receiver chains to receive in the omnidirectional manner in response to the second energy level is less than the second threshold energy level. The controller 516 and processing system 1020 are each examples of means for maintaining the subset of RF receiver chains configured to receive in the omnidirectional manner in response to the first energy level being less than a threshold energy level.

The controller 516 and processing system 1020 are each examples of means for determining that the second energy level is greater than the first energy level. The controller 516 and processing system 1020 are each examples of means for maintaining the subset of the RF receiver chains configured to receive in omnidirectional manner in response to the second energy level being less than the first energy level. The controller 516, the downstream processing 514, and processing system 1020 are each examples of means for determining that the at least one signal complies with a specified signal format. The downstream processing component 514 and processing system 1020 are each examples of means for decoding at least a portion of the frame. The controller 516 and processing system 1020 are each examples of means for reconfiguring the subset of the RF receiver chains to receive in the omnidirectional manner in response to an expiration of a time interval after decoding the at least portion of the frame.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to:
      configure a subset of a plurality of RF receiver chains coupled to respective antennas to receive in an omnidirectional manner, the subset comprising at least one RF receiver chain of the plurality of RF receiver chains;
      determine a first energy level of at least one signal received via the subset while the subset of RF receiver chains is configured to receive in the omnidirectional manner;
      configure the plurality of RF receiver chains to directionally receive from a target device based on the first energy level;
      determine a second energy level of the at least one signal received via the RF receiver chains while the RF receiver chains are configured to directionally receive from the target device; and
      generate data from the at least one signal based on the second energy level.

2. The apparatus of claim 1, wherein the processing system is configured to configure the plurality of RF receiver chains to directionally receive from the target device in response to the first energy level being equal to or greater than a first threshold energy level.

3. The apparatus of claim 2, wherein the processing system is configured to generate data from the at least one signal in response to the second energy level being equal to or greater than a second threshold energy level, the second threshold energy level being greater than the first threshold energy level.

4. The apparatus of claim 3, wherein the processing system is configured to reconfigure the subset of the RF receiver chains to receive in the omnidirectional manner in response to the second energy level being less than the second threshold energy level.

5. The apparatus of claim 1, wherein the processing system is configured to maintain the subset of RF receiver chains configured to receive in the omnidirectional manner in response to the first energy level being less than a threshold energy level.

6. The apparatus of claim 1, wherein the processing system is configured to generate data from the at least one signal in response to the second energy level being greater than the first energy level.

7. The apparatus of claim 1, wherein the processing system is configured to maintain the subset of the RF receiver chains configured to receive in omnidirectional manner in response to the second energy level being less than the first energy level.

8. The apparatus of claim 1, wherein the processing system is configured to generate data from the at least one signal in response to determining that the at least one signal complies with a specified signal format.

9. The apparatus of claim 1, wherein the at least one signal comprises a frame, and wherein the processing system is configured to generate data from the at least one signal by decoding at least a portion of the frame.

10. The apparatus of claim 9, wherein the processing system is configured to reconfigure the subset of the RF receiver chains to receive in omnidirectional manner in response to an expiration of a time interval after decoding the at least portion of the frame.

11. A method for wireless communications, comprising:
    configuring a subset of a plurality of RF receiver chains coupled to respective antennas to receive in an omnidirectional manner, the subset comprising at least one RF receiver chain of the plurality of RF receiver chains;
    determining a first energy level of at least one signal received via the subset while the subset of RF receiver chains is configured to receive in the omnidirectional manner;
    configuring the plurality of RF receiver chains to directionally receive from a target device based on the first energy level;
    determining a second energy level of the at least one signal received via the RF receiver chains while the RF receiver chains are configured to directionally receive from the target device; and
    generating data from the at least one signal based on the second energy level.

12. The method of claim 11, wherein configuring the plurality of RF receiver chains to directionally receive from the target device is in response to the first energy level being equal to or greater than a first threshold energy level.

13. The method of claim 12, wherein generating data from the at least one signal is in response to the second energy level being equal to or greater than a second threshold energy level, the second threshold energy level being greater than the first threshold energy level.

14. The method of claim 13, further comprising reconfiguring the subset of the RF receiver chains to receive in the omnidirectional manner in response to the second energy level being less than the second threshold energy level.

15. The method of claim 11, further comprising maintaining the subset of RF receiver chains configured to receive in the omnidirectional manner in response to the first energy level being less than a threshold energy level.

16. The method of claim 11, wherein generating data from the at least one signal is in response to the second energy level being greater than the first energy level.

17. The method of claim 11, further comprising maintaining the subset of the RF receiver chains configured to receive in omnidirectional manner in response to the second energy level being less than the first energy level.

18. The method of claim 11, wherein generating data from the at least one signal is in response to determining that the at least one signal complies with a specified signal format.

19. The method of claim 11, wherein the at least one signal comprises a frame, and wherein generating data from the at least one signal comprises decoding at least a portion of the frame.

20. The method of claim 19, further comprising reconfiguring the subset of the RF receiver chains to receive in the omnidirectional manner in response to an expiration of a time interval after decoding the at least portion of the frame.

21. An apparatus for wireless communications, comprising:
  means for configuring a subset of a plurality of RF receiver chains coupled to respective antennas to receive in an omnidirectional manner, the subset comprising at least one RF receiver chain of the plurality of RF receiver chains;
  means for determining a first energy level of at least one signal received via the subset while the subset of RF receiver chains is configured to receive in the omnidirectional manner;
  means for configuring the plurality of RF receiver chains to directionally receive from a target device based on the first energy level;
  means for determining a second energy level of the at least one signal received via the RF receiver chains while the RF receiver chains are configured to directionally receive from the target device; and
  means for generating data from the at least one signal based on the second energy level.

22. The apparatus of claim 21, wherein the means for configuring the plurality of RF receiver chains to directionally receive from the target device comprises means for determining that the first energy level is equal to or greater than a first threshold energy level.

23. The apparatus of claim 22, wherein the means for generating data from the at least one signal comprises means for determining that the second energy level is equal to or greater than a second threshold energy level, the second threshold energy level being greater than the first threshold energy level.

24. The apparatus of claim 23, further comprising means for reconfiguring the subset of the RF receiver chains to receive in the omnidirectional manner in response to the second energy level being less than the second threshold energy level.

25. The apparatus of claim 21, further comprising means for maintaining the subset of RF receiver chains configured to receive in the omnidirectional manner in response to the first energy level being less than a threshold energy level.

26. The apparatus of claim 21, wherein the means for generating data from the at least one signal comprises means for determining that the second energy level being greater than the first energy level.

27. The apparatus of claim 21, further comprising means for maintaining the subset of the RF receiver chains configured to receive in omnidirectional manner in response to the second energy level being less than the first energy level.

28. The apparatus of claim 21, wherein the means for generating data from the at least one signal comprises means for determining that the at least one signal complies with a specified signal format.

29. The apparatus of claim 21, wherein the at least one signal comprises a frame, and wherein the means for generating data from the at least one signal comprises means for decoding at least a portion of the frame.

30. A wireless node, comprising:
  a plurality of antennas;
  a plurality of RF receiver chains coupled to the plurality of antennas, respectively; and
  a processing system configured to:
    configure a subset of a plurality of RF receiver chains coupled to respective antennas to receive in an omnidirectional manner, the subset comprising at least one RF receiver chain of the plurality of RF receiver chains;
    determine a first energy level of at least one signal received via the subset while the subset of RF receiver chains is configured to receive in the omnidirectional manner;
    configure the plurality of RF receiver chains to directionally receive from a target device based on the first energy level;
    determine a second energy level of the at least one signal received via the RF receiver chains while the RF receiver chains are configured to directionally receive from the target device; and
    generate data from the at least one signal based on the second energy level.

* * * * *